United States Patent [19]
Jones

[11] Patent Number: 5,410,143
[45] Date of Patent: Apr. 25, 1995

[54] SPACE TARGET DETECTING AND TRACKING SYSTEM UTILIZING STARLIGHT OCCLUSION

[75] Inventor: Richard J. Jones, Winchester, Mass.

[73] Assignee: The Charles Stark Draper Laboratory, Inc., Cambridge, Mass.

[21] Appl. No.: 22,739

[22] Filed: Feb. 24, 1993

[51] Int. Cl.$^6$ .............................................. G01J 1/20
[52] U.S. Cl. ................................. 250/206.1; 364/455
[58] Field of Search ............... 250/203.1, 203.6, 206.1, 250/206.2, 222.1, 221; 358/103, 105, 125; 356/141, 152; 364/455, 456; 244/3.17, 3.18

[56] References Cited

U.S. PATENT DOCUMENTS

| 3,274,880 | 9/1966 | Lillestrand et al. | 250/203.6 |
|---|---|---|---|
| 3,614,239 | 10/1971 | Kissell | 250/203.6 |
| 3,879,728 | 4/1975 | Wolff | 244/3.17 |
| 3,936,632 | 2/1976 | Bradley et al. | |
| 3,994,600 | 11/1976 | Tarasevich | |
| 4,123,164 | 10/1978 | Tambor | |
| 4,159,419 | 6/1979 | Wittke | |
| 4,311,383 | 1/1982 | Ohtsubo | |
| 4,330,705 | 5/1982 | Kollodge | |
| 4,444,546 | 4/1984 | Pazemenas | |
| 4,453,224 | 6/1984 | Crooks, Jr. | |
| 4,790,641 | 12/1988 | Halldorsson | |
| 4,861,984 | 8/1989 | West | |
| 4,963,018 | 10/1990 | West | |
| 5,177,686 | 1/1993 | Böinghoff et al. | 250/203.6 |

OTHER PUBLICATIONS

Hartmann, Richard L., United States Statutory Invention Registration No. H712, *Method Of Stellar Navigation Using An Optical Correlator*, filed Aug. 3, 1988, published Nov. 7, 1989.

Primary Examiner—David C. Nelms
Assistant Examiner—K. Shami
Attorney, Agent, or Firm—Weingarten, Schurgin, Gagnebin & Hayes

[57] ABSTRACT

A system for detecting and tracking targets or objects located in the earth's shadow. The system senses and processes starlight from one or more stars. More particularly, the stellar background provides an illumination source with which targets are detected as they eclipse or occlude one or more stars. The system includes a receiver which collects incident starlight and a sensor, coupled to the receiver, for sensing the collected starlight focused thereon by the receiver and for providing a sensor output signal indicating the intensity of the sensed starlight. A signal processor, responsive to the sensor output signal, provides a target detection signal indicating whether a target has crossed the line of sight between the receiver and one or more stars. The signal processor may be further responsive to a stellar background catalog for providing the target detection signal with bearing information indicating the bearing of a detected target.

17 Claims, 11 Drawing Sheets

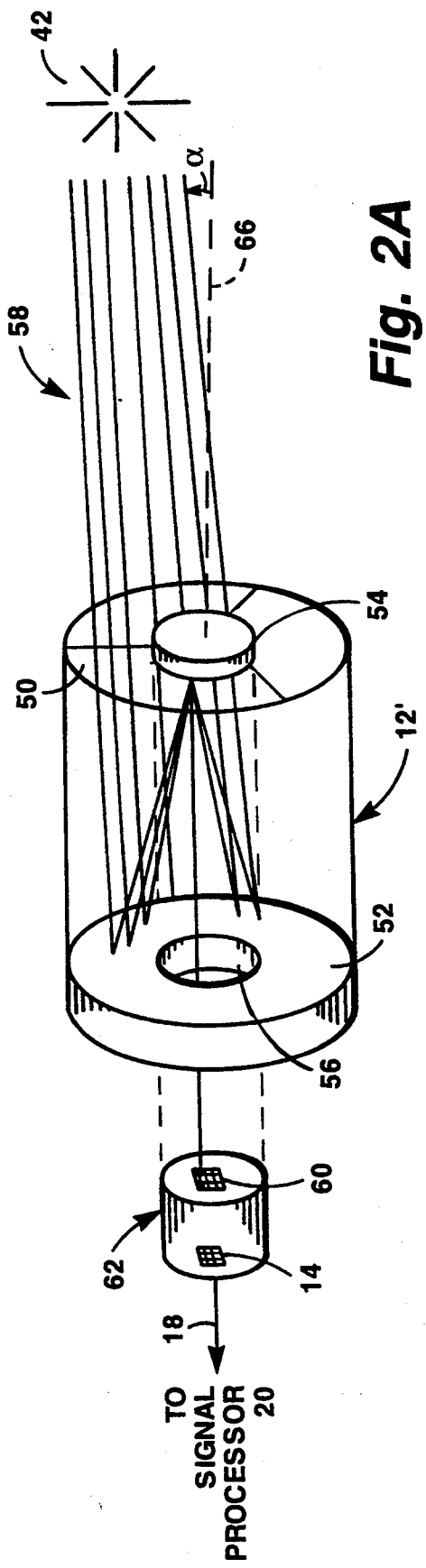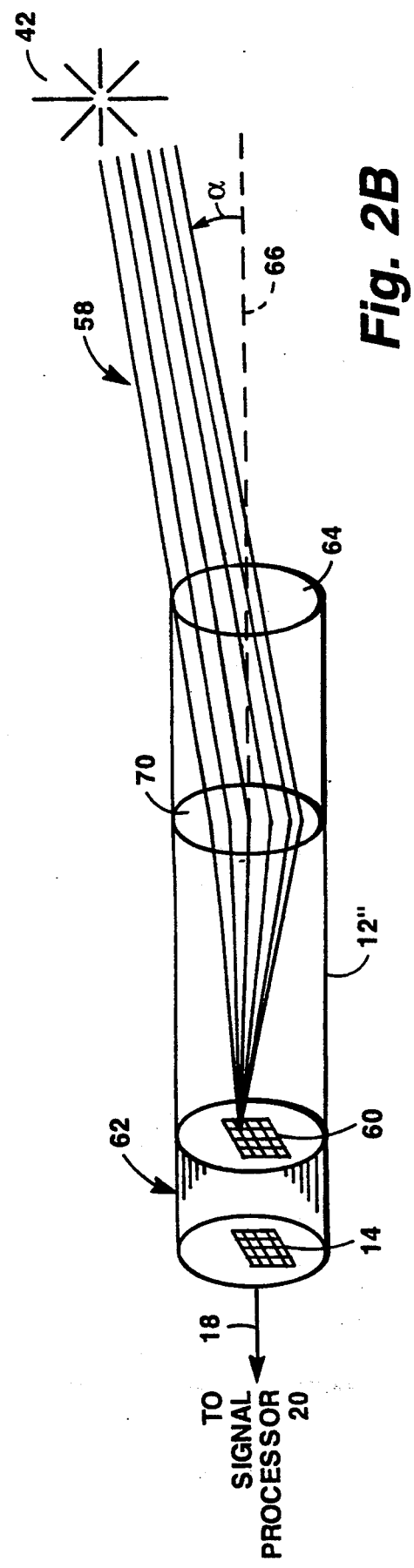

SPACE TARGET DETECTING AND TRACKING SYSTEM UTILIZING STARLIGHT OCCLUSION

FIELD OF THE INVENTION.

This invention relates generally to passive space surveillance systems and more particularly to a system and method for detecting the presence and bearing of objects in space, in response to occlusion and diffraction of starlight.

BACKGROUND OF THE INVENTION

Surveillance techniques and systems for detecting the presence and bearing of objects in space can be categorized, generally, as either passive or active. Typically, active systems require some type of electromagnetic energy emission, such as in the case of radar or laser systems. Passive systems on the other hand, rely on sensors which respond to natural phenomena or signal emissions from objects.

One type of passive space surveillance system senses sunlight reflected off objects or targets. Thus, while this technique may be suitable for daytime detection, it does not provide nighttime detection capability. That is, when a target is located in the earth's shadow, visible light sensing is unsuitable since there is no reflected visible light with which to sense a target.

One passive surveillance system for detecting targets located in the earth's shadow utilizes Long Wave Infrared (LWIR) detectors which rely on the self-emission of infrared radiation by targets. The resolution of LWIR detectors is equal to the product of a diffraction limit and the distance between the detector aperture and the target (i.e., the target range). More particularly, the diffraction limit is inversely proportional to detector aperture size (i.e., 1.22λ aperture size). Thus, the resolution is bounded by feasible aperture size. For example, a LWIR detector operating at a wavelength of ten microns and having a 0.5 meter aperture, has a resolution of approximately forty-five meters for targets located at a range of one-thousand nautical miles. With such an arrangement, the detection of closely spaced objects (i.e., for example, those spaced closer than forty-five meters) may pose a problem. Moreover, LWIR detectors generally require target temperatures of at least three-hundred degrees Kelvin for detection. Thus, detection may be avoided by cooling a target. Furthermore, LWIR detector elements can be complex and costly to manufacture.

SUMMARY OF THE INVENTION

According to the present invention, a system for detecting objects in space utilizing starlight comprises a receiver for collecting incident starlight, a sensor, coupled to the receiver, for sensing the collected starlight focused thereon by the receiver and for providing a sensor output signal indicating the intensity of the sensed starlight. Also provided is a signal processor, responsive to the sensor output signal, for providing a target detection signal indicating whether an object has crossed the line of sight between the receiver and one or more stars (i.e., indicating whether a target has been detected). The signal processor may be further responsive to a stellar background catalog, which contains intensity and location information for known stars, for providing the bearing of a detected target.

With this arrangement, an improved passive surveillance system is provided with the capability of detecting objects or targets located in the earth's shadow. The present system relies on occlusion of starlight to detect the targets. The receiver may comprise a telescope and the sensor may comprise one or more elements, such as charge coupled devices, with each such element providing a sensor output signal indicating the intensity of the starlight focused thereon by the receiver. In response to the sensor output signals, the signal processor provides the target detection signal indicating whether a target has been detected. Such a target detection signal may be provided by averaging samples of each sensor output signal and detecting a difference in each such sensor signal over time. The target detection signal may also be provided by comparing the magnitude of each of the sensor output signals with expected signal magnitudes provided by the stellar catalog. The target detection signal may provide information regarding the bearing of a detected object, such as may be provided by the stellar catalog information.

With use of the stellar catalog information, the resolution of the surveillance system is not limited by the constraints of the sensor/receiver system. That is, the number of sensor elements, the field of view of the receiver, and the target range determine, to a first approximation, the resolution of the target detection. Here however, target detection relies on a target crossing the line of sight (LOS) between the receiver and one or more stars. Moreover, there is a high probability that only one star will be associated with the field of view of each sensor element. Thus, once the location of the star occluding object is resolved to within the field of view of a particular sensor element, such location may be further resolved by the stellar catalog information indicating the precise location of the occluded star. In this way, the use of starlight as the illumination source for target detection and the availability of accurate star location information provides the present system with greater resolution than otherwise achievable.

BRIEF DESCRIPTION OF THE DRAWINGS

These and other features of the invention will be better understood by reading the following detailed description, taken together with the drawings, in which:

FIG. 2A is a simplified schematic representation of a telescope for use with the target detecting and tracking system of FIG. 1;

FIG. 2B is a simplified schematic representation of an alternate embodiment of a telescope for use with the target detecting and tracking system of FIG. 1;

DESCRIPTION OF THE PREFERRED EMBODIMENT

Figure 1:
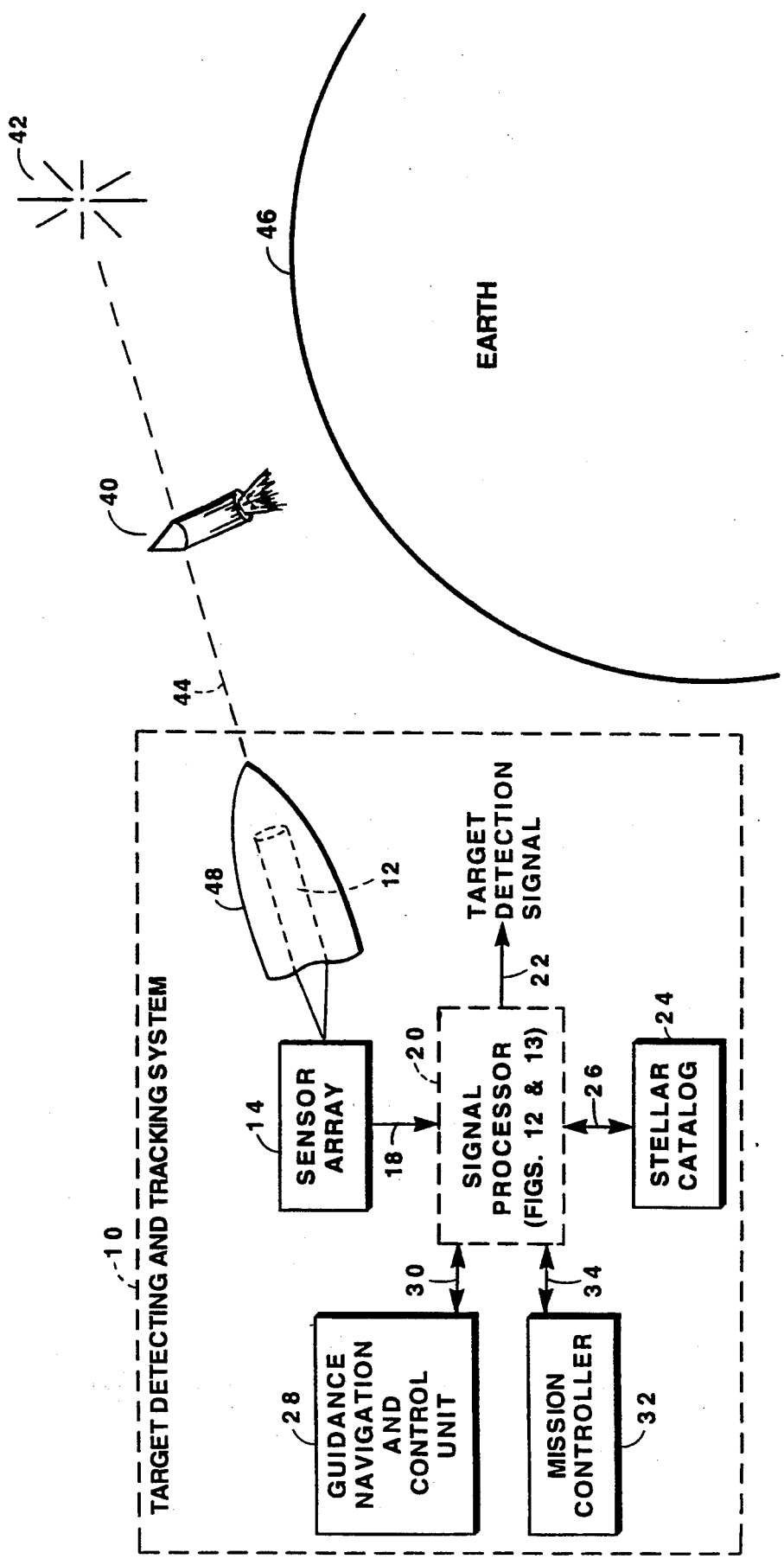
FIG. 1 is a simplified schematic representation of a system for detecting and tracking a target in space in accordance with the present invention.

Referring now to FIG. 1, a system 10 for detecting and tracking objects or targets in space includes a receiver 12 for collecting incident starlight and a sensor 14, coupled to the receiver 12, for sensing the collected starlight focused thereon by the receiver and for providing a sensor output signal 18 indicating the intensity of the sensed starlight. Generally, the sensor 14 comprises a plurality, and here $N^2$, sensor or detector elements arranged in an array (i.e., hereinafter referred to as sensor array 14), with each such element providing a sensor output signal on line 18 indicating the intensity of starlight focused thereon by the receiver 12, as will be described. A signal processor 20 is responsive to the sensor output signals 18 and provides a target detection signal 22 indicating whether a target 40 has been detected. Target detection signal 22 may additionally include information regarding the bearing of a detected target 40 relative to the receiver 12 and/or the earth 46. Also provided is a Guidance, Navigation, and Control (GNC) unit 28 communicating with signal processor 20 via signal line 30, a mission controller 32 communicating with signal processor 20 via signal line 34, and an optional stellar catalog 24 communicating with signal processor 20 via signal line 26. Mission controller 32 may comprise a microprocessor which controls aspects of the mission of the missile 48 which houses receiver 12, such as the trajectory along which the missile 48 travels. GNC unit 28 provides conventional guidance and navigation capability and may, for example, comprise attitude sensing gyroscopes.

Target detecting and tracking system 10 detects the presence of a target 40 as it crosses the line of sight (LOS) between the receiver 12 and one or more stars, such as star 42 (i.e., such LOS shown by dotted line 44). The LOS 44 of the receiver 12, while shown in FIG. 1 to be centered with respect to the receiver, may refer to any path between such receiver and one or more stars within the receiver field of view. Thus, stated differently, target 40 is detected when such target 40 occludes or eclipses one or more stars, such as star 42, within the field of view of the receiver 12. Moreover, system 10 detects not only targets such as the missile 40 shown, but any objects in space, such as a satellite or meteor. Receiver 12, as well as additional system electronics including the GNC unit 28, the mission controller 32, the signal processor 20, and the stellar catalog 24, may be housed in a satellite (not shown) suitable for surveillance missions. Alternatively, it may be desirable to house the system 10 in a missile 48, as shown, such as may be suitable for strategic missions. For example, once a target, such as a threatening missile 40 is detected and the detection event communicated to mission controller 32 via the target detection signal 22, for example, destruction of the threatening missile 40 by missile 48 or other apparatus may be warranted. In some cases, the system 10 or a portion of the electronics associated therewith, may be located on the earth 46.

Receiver 12 may comprise any conventional telescope, such as the exemplary reflective telescope 12' shown in FIG. 2A. Here, telescope 12' is shown to have a Cassegranian mirror arrangement. More particularly, telescope 12' has a light receiving aperture 50, a primary mirror 52, and a secondary mirror 54, arranged as shown. Light, for example from a star 42 as shown by collimated lines 58, enters the aperture 50 and is reflected by primary mirror 52 onto the secondary mirror 54, as is known. Light thus impinging on the secondary mirror 54 is reflected by the secondary mirror 54, through an aperture 56 in the primary mirror 52, to focus on the sensor array 14. In this way, telescope 12' focuses incident light on sensor array 14 at a location corresponding to the angle $\alpha$ between the incident light 58 and a LOS 66 of the telescope 12' normal to the plane of the aperture 50. It is noted that the light 58 from a star 42 is collimated as shown due to the expansive distance between the receiver 12 and any known star, such as the nearest known star, the Alpha Centauri.

Also shown in FIG. 2A is an image intensifier 62 disposed between the aperture 56 of the primary mirror 52 and the sensor array 14. Image intensifier 62 amplifies or intensifies the incident light in order to enhance target detection by increasing the signal to noise ratio. Additionally, image intensifier 62 may be used to alter the size or form factor of the focal plane 60, such focal plane 60 being determined by the size of the aperture 56, to a size or form factor corresponding to the focal plane of the desired sensor array 14.

Here, sensor array 14 is comprised of a plurality (i.e., $N^2$) of charge coupled devices (CCDs), each of which provides an electrical signal 18 in response to incident light radiation. The quantum efficiency parameter of a CCD indicates the magnitude of the electrical signal 18 (i.e., number of photoelectrons or electrons) resulting from one incident photon of light. For example, a CCD having a quantum efficiency of 0.5 provides 0.5 photoelectrons of output signal 18 for every photon incident thereon.

Referring now to FIG. 2B, an alternate telescope arrangement 12" is shown to be of a refractive type and includes a light receiving aperture 64 and an optical lens 70. In response to light entering aperture 64 and incident on lens 70, such as the light 58 from star 42, lens 70 focuses the light 58 onto the sensor array 14. That is, like the Cassegranian arrangement of FIG. 2A, lens 70 focuses light 58 onto the sensor array 14 at a location corresponding to the angle $\alpha$ between the incident, collimated light 58 and a LOS 66 of the receiver 12" normal to the plane of the aperture 64. As described above in conjunction with FIG. 2A, an image intensifier 62 may be provided, here shown disposed between the lens 70 and the sensor array 14, for amplifying the incident light and/or for transposing the focal plane 60 onto the focal plane of the desired sensor array 14.

As noted above in conjunction with FIG. 1, the stellar background catalog 24 is an optional, albeit preferred, feature of the target detecting and tracking system 10. Stellar catalog 24 comprises any conventional memory device and contains data representative of the intensity and location of known stars, such as may be provided by ephemeral tables. One function of the stellar catalog 24 is to resolve the bearing of a detected target 40 by determining the line of sight 44 between the receiver 12 and a star 42 which is intersected by the target 40. Since detection occurs when a target 40 crosses such LOS 44, the bearing of the detected target 40 can be ascertained from the location of the occluded star relative to earth as provided by the stellar catalog 24 and the location of the missile 48 relative to earth as provided by the GNC unit 28. Stated differently, once it is determined which star 42 is occluded by a target 40, the position of such star can be retrieved from the stellar catalog 24 and used in conjunction with GNC data to ascertain the bearing of the detected target 40.

In applications in which the stellar catalog 24 is not used, the bearing of the detected target 40 can be ascertained by using information from the GNC unit 28 as well as the location of the occluded star 42 on the focal plane 14 relative to the telescope boresight 66. That is, as mentioned, the light 58 is focused onto sensor array 14 at a location corresponding to the angle $\alpha$ between the incident, collimated light 58 and the LOS 66 of the receiver normal to the plane of the aperture. Thus, the location of the sensor array 14 at which such light is focused yields the angle $\alpha$ between LOS 66 and the occluded star 42 which, in conjunction with the GNC data as to the location of the missile 48 relative to earth, provides the bearing of the detected target 40.

An additional function of the stellar catalog 24 is that the star intensity information contained therein provides target detecting capability, as will be described in conjunction with FIGS. 12 and 13. Suffice it here to say that the intensity of collected starlight is compared with the intensity of data stored in the stellar catalog 24. A target 40 is detected in this way by sensing a deviation between the collected starlight intensity and the cataloged starlight intensity.

An additional advantage of the stellar catalog 24 is that its use improves the resolution of system 10 beyond that otherwise achievable. That is, when stellar catalog 24 is used, the system resolution is not limited by the number of sensor elements $N^2$ in the sensor array 14, the field of view of the receiver 12 (i.e., a function of the size of the light receiving aperture thereof), and the distance (i.e., range) between a target 40 and the receiver 12. While such factors do, to a first approximation, determine the system resolution and more importantly, determine the resolution of system 10 when the stellar catalog 24 feature is not used, preferably the resolution is enhanced by the use and accuracy of the stellar catalog information. More particularly, the stellar catalog 24 information can be used to ascertain the exact location of an occluded star 42 and thus, the exact location of the target 40 causing the occlusion.

It is noted that in either case (i.e., when the stellar catalog 24 is or is not used), the accuracy of the target detecting and tracking system 10 is enhanced by the relatively small ratio of the distance between the receiver 12 and the target 40 to the distance between the target 40 and any known star 42. Moreover, this distance ratio results in the geometric parallax of the receiver 12 with respect to a star 42 being so small as to be negligible. For example, a target 40 covering a one square-meter area and located at a range of approximately five-hundred nautical miles from the system 10 appears approximately twenty-four times larger than the Alpha Centauri. Thus, even at 5,000 nautical miles from the detection system 10, such a one square-meter target 40 still appears to be approximately 2.4 times larger than the Alpha Centauri. Due to the negligible effect of geometric parallax, the system 10 is relatively insensitive to the separation or distance between the system 10 and the target 40 (i.e., range).

Figure 3:
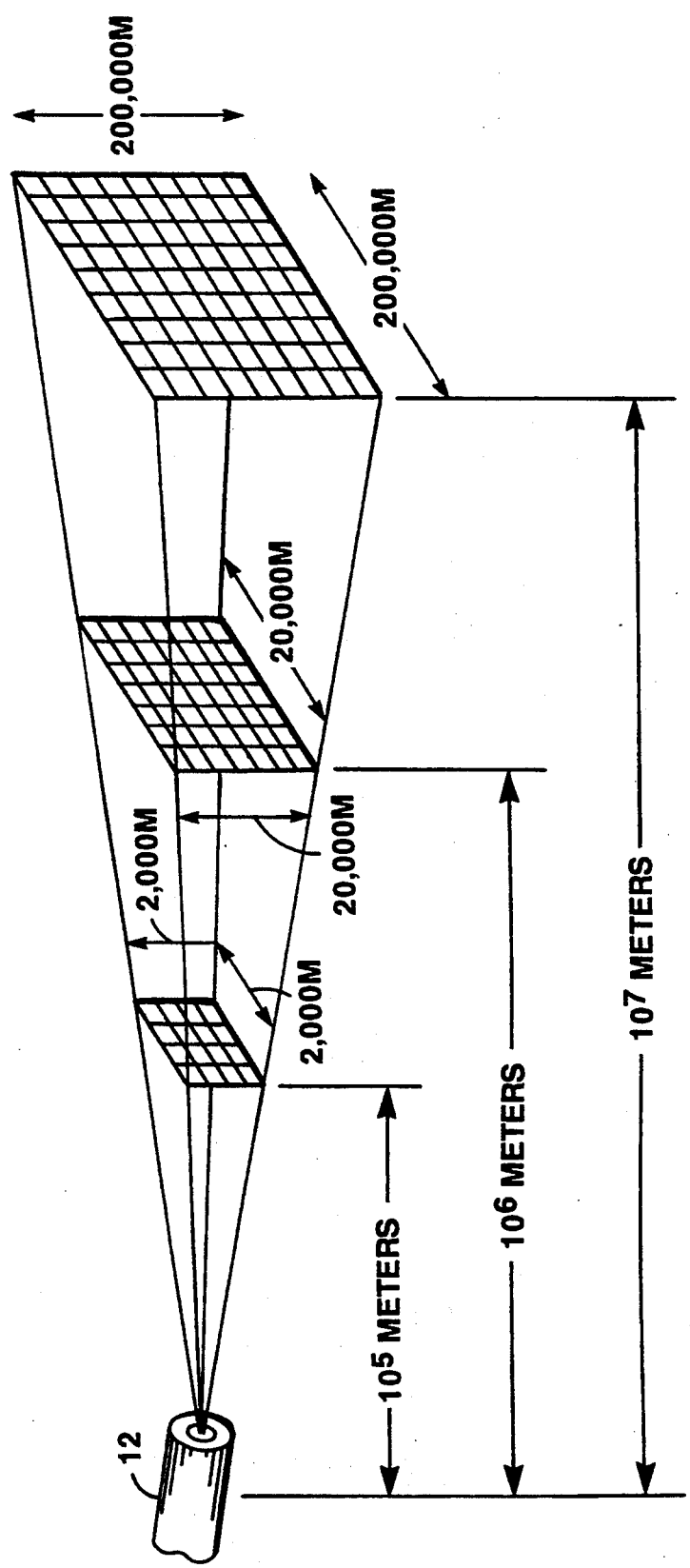
FIG. 3 is a diagrammatical representation of the target detecting and tracking system of FIG. 1 showing the number of resels within the field of view at various ranges for a one meter target.

In order to better understand the system resolution and the enhancement thereof provided by the use of the stellar catalog 24, refer now to FIG. 3. Consider first the case where the stellar catalog 24 is not used and the exemplary system 10 has a receiver field of view of 1.11 degrees by 1.11 degrees and a sensor array 14 including $2,000 \times 2,000$ elements (i.e., $N=2,000$ and $N^2=$ four million). This field of view corresponds to $4,000 \times 4,000$ arc seconds or $0.02 \times 0.02$ radians. The system resolution can be determined by dividing the product of target range and receiver field of view by the number of sensor elements N along one side of the array 14 (i.e., in the case of a simple square shaped field of view). For example, when the target 40 is located at a range of 100,000 meters, the resolution is given by $(0.02 \text{ radians} \times 100,000 \text{ meters})/2,000$, or one meter. Thus, the resolution window or field of view of a single sensor element, referred to alternatively as a resel, corresponds to a one square-meter field of view at such range. Whereas, when the target 40 is disposed at a range of one million meters ($\sim 540$ nautical miles), each resel, corresponds to a ten square-meter field of view. Stated differently, when a target 40 is located one million meters from the receiver 12, its location can be resolved only to within a ten meter by ten meter square area. Whereas, when the target 40 is located 100,000 meters from the receiver 12, its location can be resolved to within one meter.

However, where the stellar catalog 24 is used, the resolution of system 10 exceeds that described above and is based, in part, on the accuracy of the star location information provided by the stellar catalog 24. The improved resolution is further based on the relatively high probability of each resel encountering only one star, as described below. More particularly, once the location of a target 40 has been ascertained to within a given resel, such as a ten meter by ten meter square area for example, the star catalog 24 can be used to provide information as to the exact location of the star associated with the resel of detection. And, since detection occurs when a target 40 occludes a star, the location of the star yields the location of the target 40. In this way, the resolution is enhanced.

Figure 4:
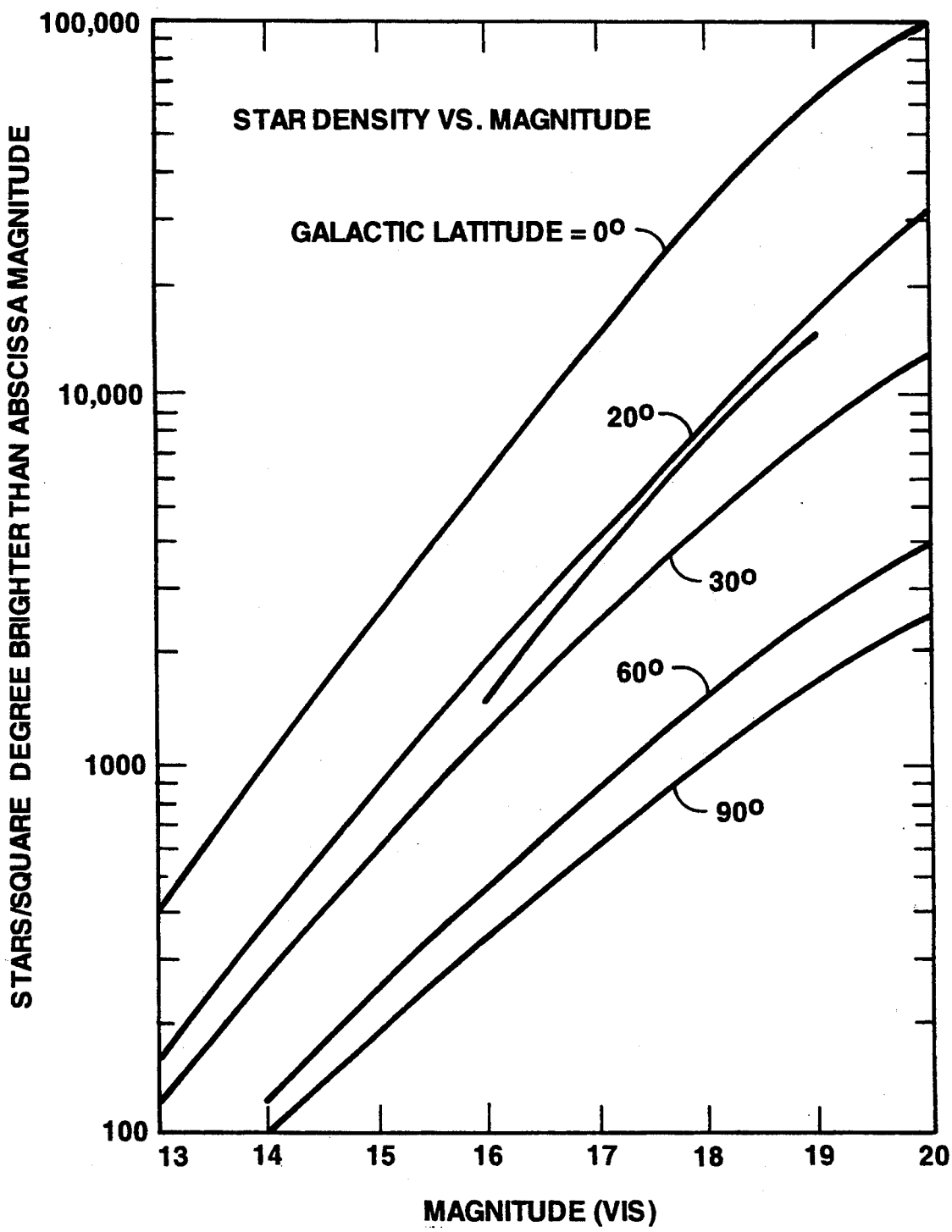
FIG. 4 is a graph illustrating star density versus magnitude for various galactic latitudes.
Figure 5:
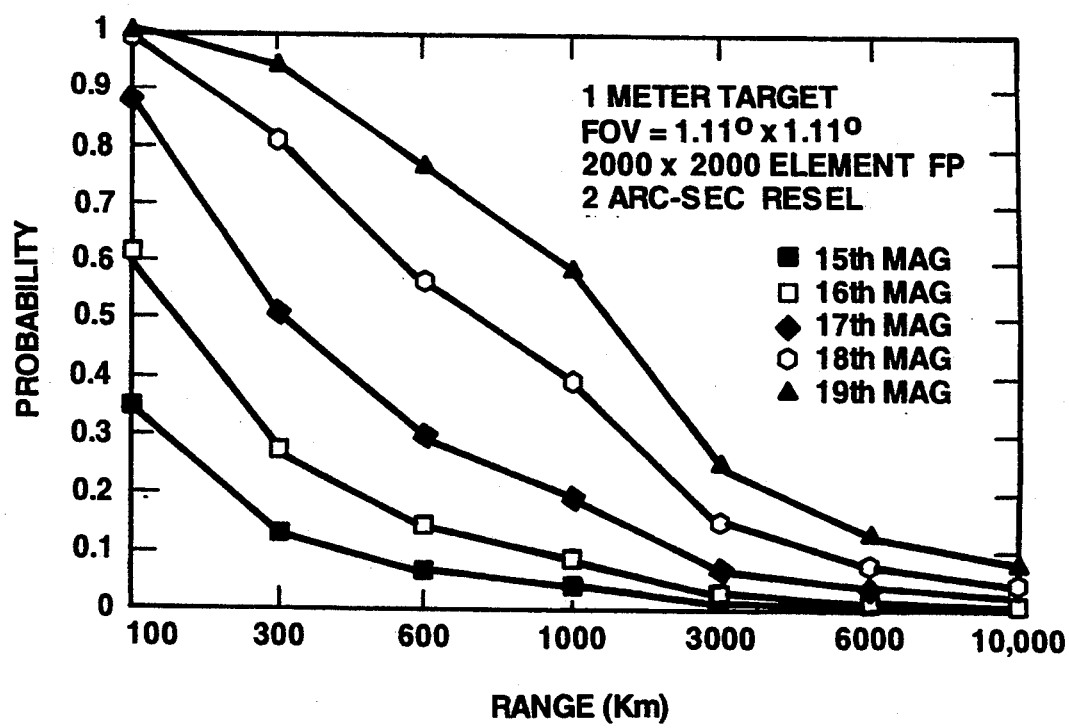
FIG. 5 is a graph illustrating the probability of star occlusion versus target range for a one meter target and for various star magnitudes.
Figure 6:
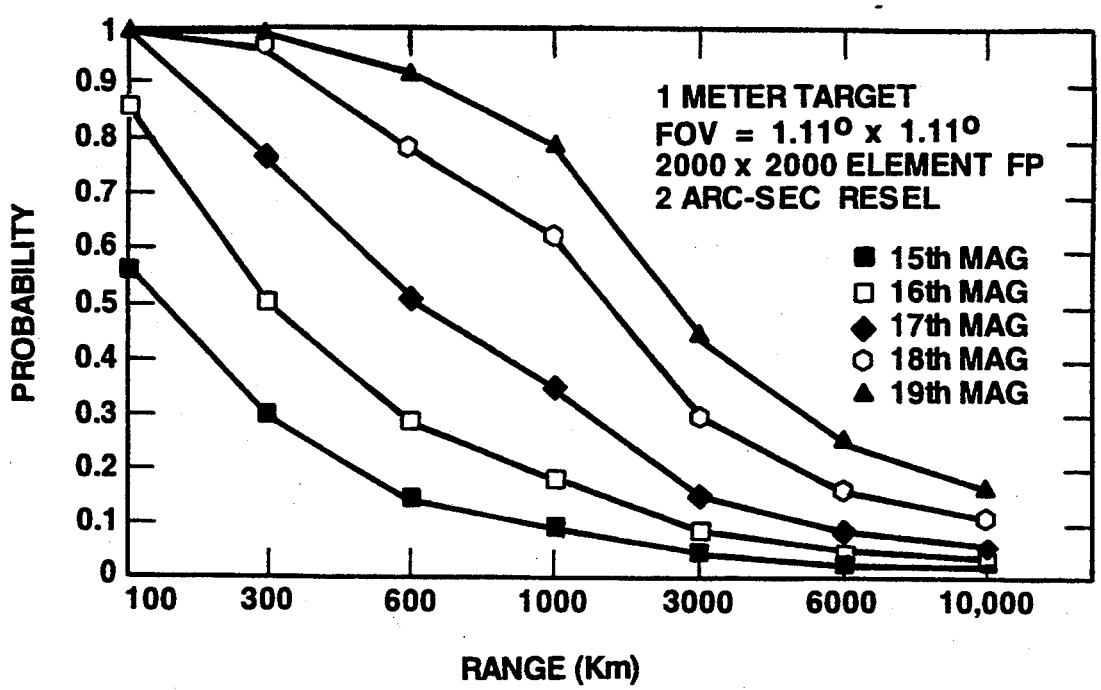
FIG. 6 is a graph illustrating the probability of star occlusion versus target range for a one meter target and for various star magnitudes for a receiver having two apertures.
Figure 7:
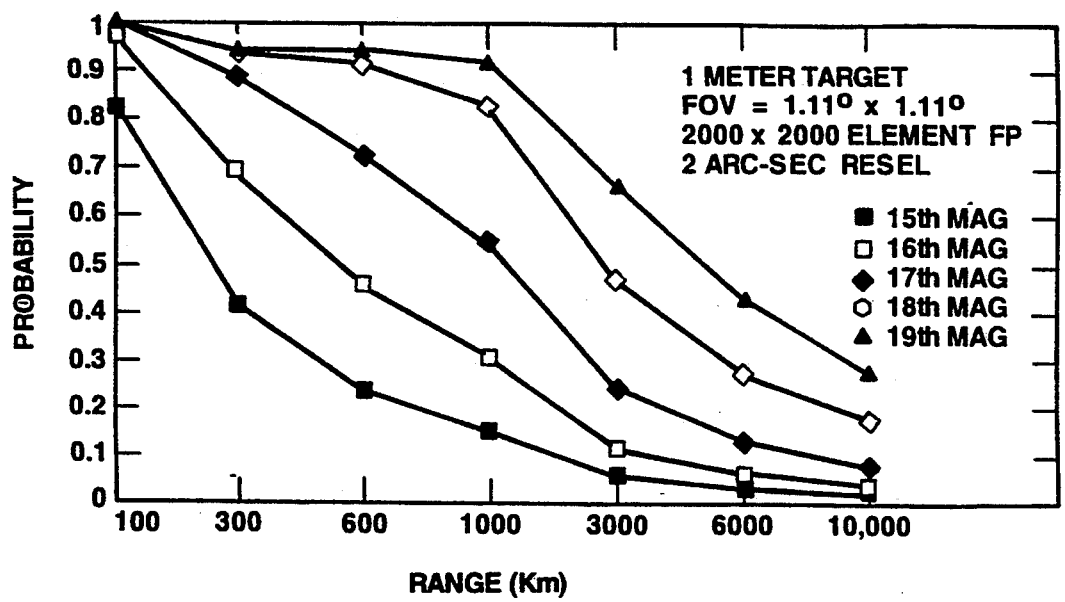
FIG. 7 is a graph illustrating the probability of star occlusion versus target range for a one meter target and for various star magnitudes for a receiver having four apertures.
Figure 8:
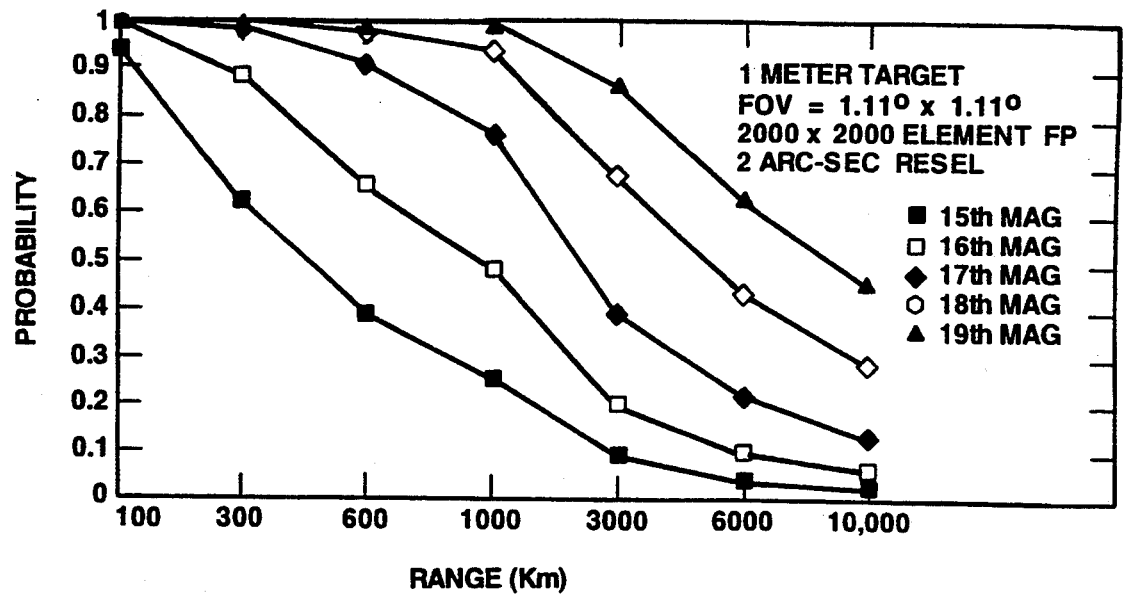
FIG. 8 is a graph illustrating the probability of star occlusion versus target range for a one meter target and for various star magnitudes for a receiver having seven apertures.
Figure 9:
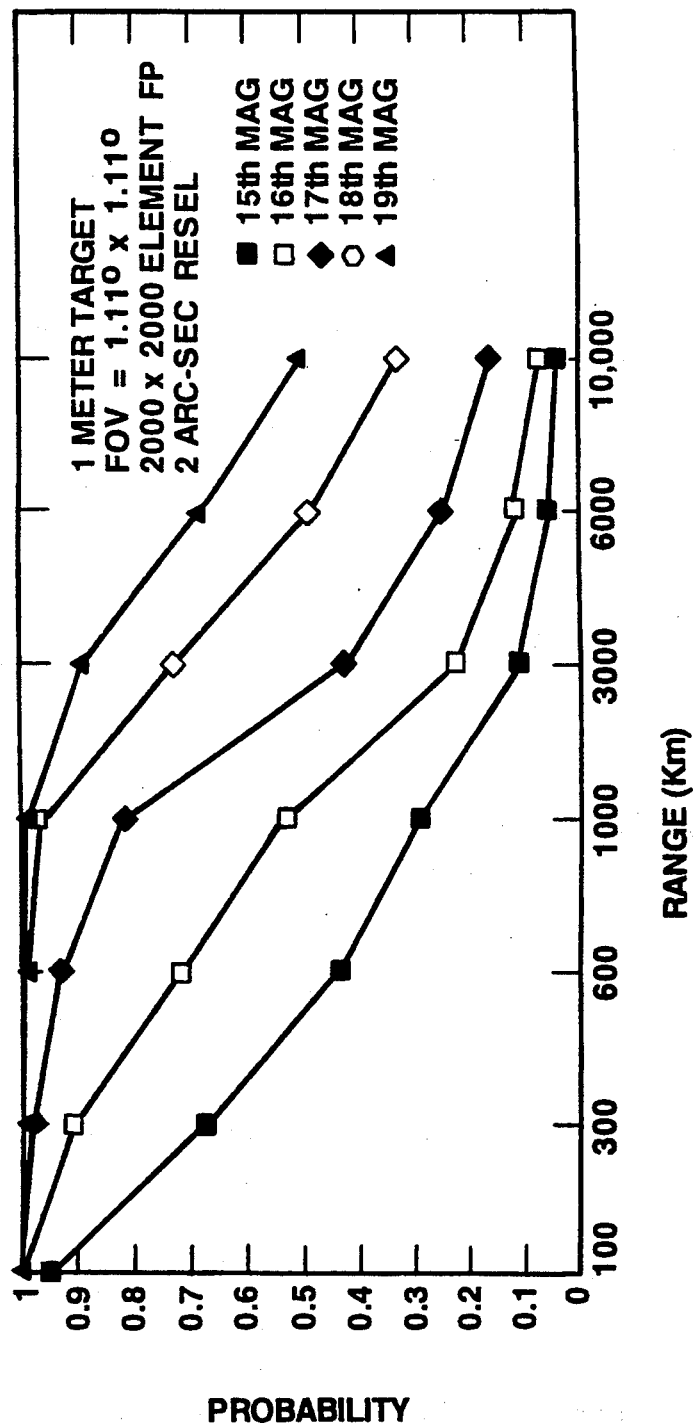
FIG. 9 is a graph illustrating the probability of star occlusion versus target range for a one meter target and for various star magnitudes for a receiver having eight apertures.

The random probability of a target 40 encountering a star 42 is given by the following equation:

$$P_w = \frac{W}{W+B} \qquad (1)$$

where W is equal to the number of stars in the receiver's field of view and B is equal to the number of elements in the sensor array 14 minus W (i.e., $B=N^2-W$). A statistical presentation of the number of stars in the field of view can be found in a book entitled "Astrophysical Quantities" by C. W. Allen, (Athlone Press, third edition, 1976). More particularly, FIG. 4 illustrates star density versus star magnitude as viewed from various galactic latitudes. Specifically, star density is given in stars/square degree so that, knowing the square degrees of the receiver field of view, the number of stars contained therein can be computed. For example, considering magnitude sixteen stars, there are approximately 2,000 stars/square degree when viewed from the galactic latitude of twenty degrees. Thus, for the exemplary receiver 12 described above in conjunction with FIG. 3, wherein the sensor array 14 includes 2,000×2,000 elements and the field of view is 1.232 square degrees, there are approximately 2464 stars in the entire field of view. From this information, it is apparent that only a relatively small fraction of the sensor elements, of which there are four million, encounter stars. Stated differently, there is a high probability that a resel will encounter no more than one star. The probability of a target 40 encountering a star 42 when traversing N resels (i.e. crossing the receiver field of view) is given by:

$$P_{WN} = 1 - \left(\frac{B}{W+B}\right)^N \quad (2)$$

where N is the number of sensor elements along one side of a square sensor array 14.

System 10 may include a plurality of light receiving apertures (i.e., like aperture 50 of the telescope 12' of FIG. 2A). The probability of a target 40 encountering a star 42 when system 10 includes more than one aperture may be computed by the following equation:

$$P_{WN_x} = 1 - (1 - P_{WN})^X \quad (3)$$

where X is the number of light receiving apertures of system 10. FIGS. 5–9 show the probability of occlusion (i.e., the probability of encountering a star) by a one meter target versus range for various star magnitudes and for detection systems having one, two, four, seven, and eight apertures, respectively. More particularly, such systems comprise a 1.11 degree × 1.11 degree field of view and a 2,000×2,000 element sensor array 14. It is noted that in systems 10 having more than one light receiving aperture, the center to center spacing of the apertures is preferably selected in accordance with the size of the target of interest 40. That is, by so selecting the center to center spacing of the apertures, it can be ensured that a particular target will not be redundantly sensed by more than one aperture at a given time.

Figure 10:
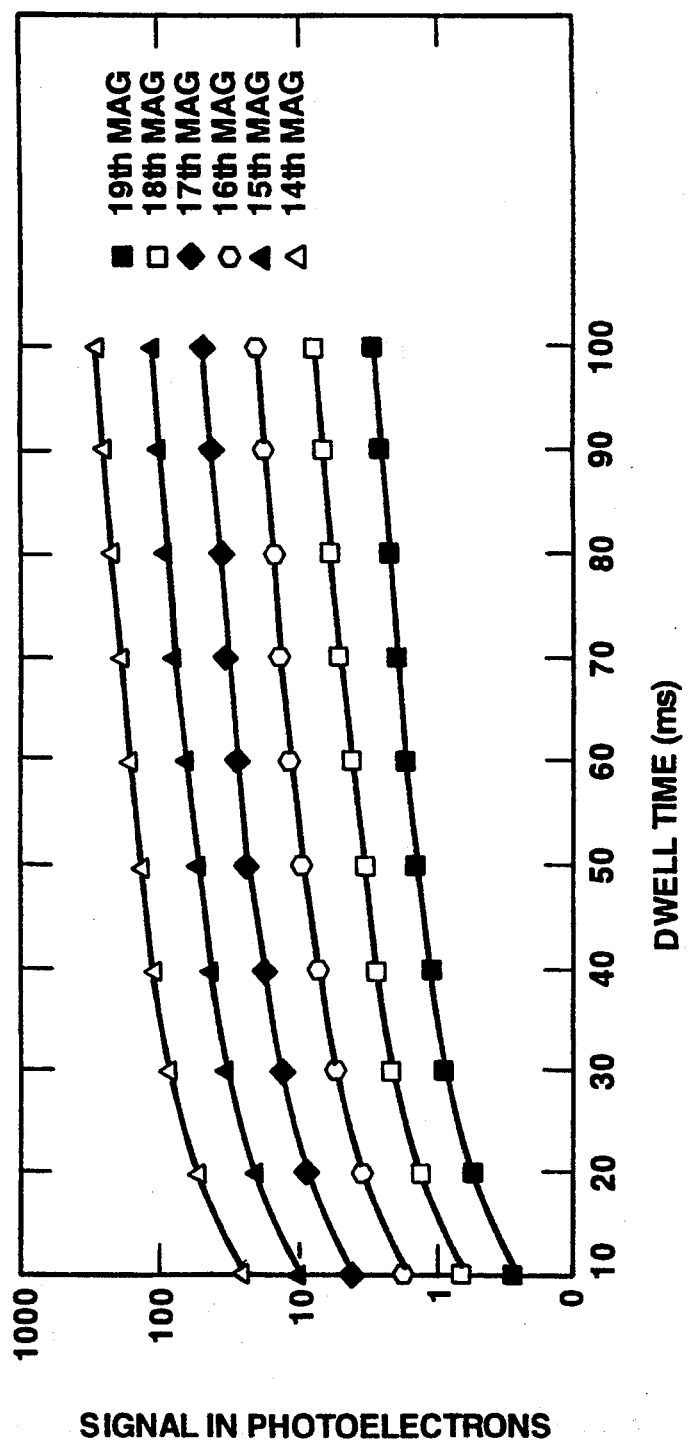
FIG. 10 is a graph illustrating the magnitude of the sensor output signal in number of photoelectrons versus target dwell time for various star magnitudes for a twenty centimeter aperture.
Figure 11:
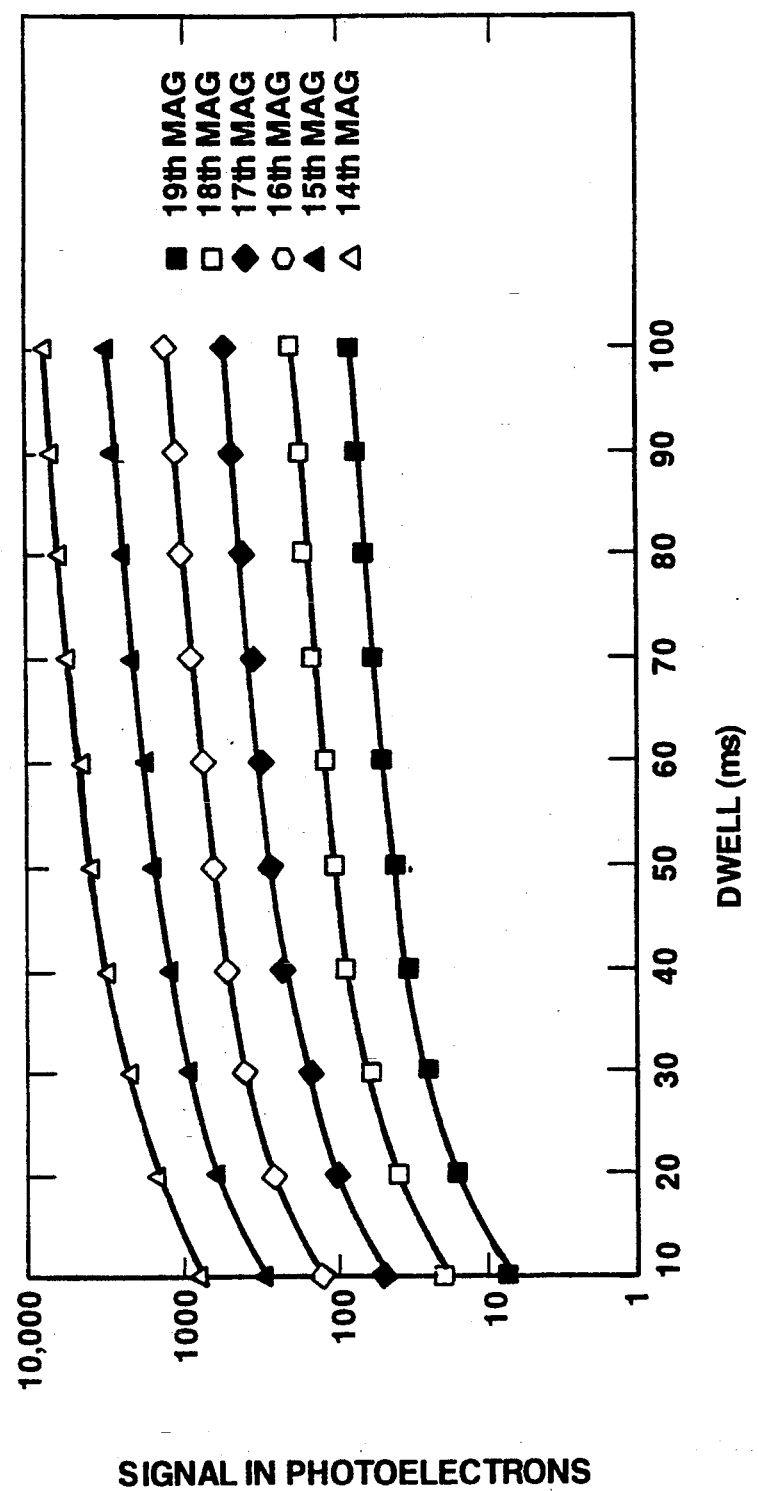
FIG. 11 is a graph illustrating the magnitude of the sensor output signal in number of photoelectrons versus target dwell time for various star magnitudes for a one meter aperture.

As mentioned above, sensor array 14 provides a plurality of signals 18, each one corresponding to one of the elements in the sensor array 14. The number of photoelectrons emitted by each such sensor element is a function of the quantum efficiency of the charged coupled device elements, as mentioned. More particularly, the level or magnitude of the signal 18 provided by each of the sensor elements is given by the following equation:

$$N_{pe} = \frac{I_o A_o Q \tau T_o}{(2.512)^m (hc/\lambda)} \quad (4)$$

where $N_{pe}$ is the number of photoelectrons generated by one of the sensor array elements, $I_o$ is the radiance of a zero magnitude star, $A_o$ is the area of the aperture, $\tau$ is the dwell time of the target 40 (i.e., the length of time that the target 40 occludes the star 42), m is the magnitude of the occluded star, $hc/\lambda$ is the photon energy integrated over the spectral bandwidth of the focal plane, Q is the quantum efficiency of the sensor elements integrated over the spectral bandwidth of the focal plane, and $T_o$ is the optical transmission. Based on this equation, the number of photoelectrons comprising each sensor output signal 18 as a result of incident light is illustrated in the graphs of FIGS. 10 and 11 for the exemplary system 10 described above. More particularly, FIG. 10 shows the number of photoelectrons as a function of dwell time for various star magnitudes and a system 10 with a twenty centimeter diameter light receiving aperture. FIG. 11 shows the number of photoelectrons as a function of dwell time for various star magnitudes and for a light receiving aperture with a diameter of one meter. Note that the assumed quantum efficiency for the computations shown graphically in FIGS. 10 and 11 is 0.5.

Figure 12:
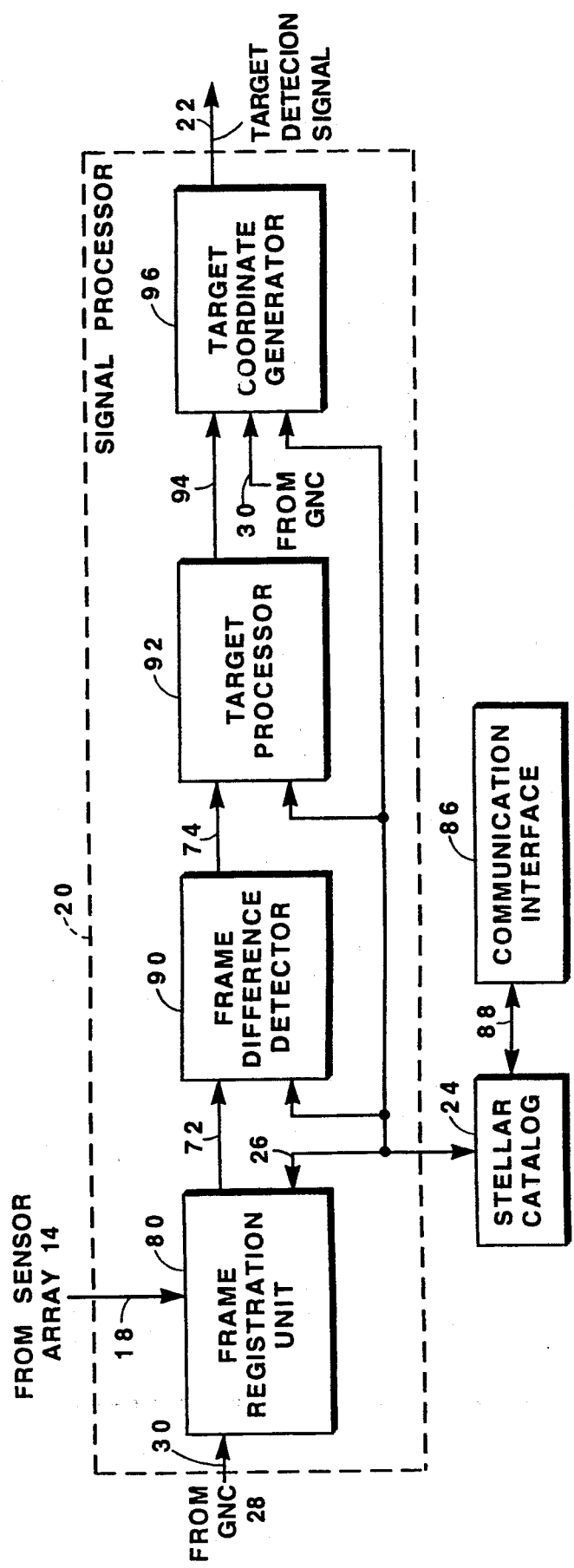
FIG. 12 is detailed block diagram of the signal processor of FIG. 1.

Referring now to FIG. 12, the signal processor 20 of the target detecting and tracking system 10 of FIG. 1 is shown in greater detail. As noted above, each of the plurality of elements of sensor array 14 provides a sensor output signal 18 to signal processor 20. More particularly, the strength of the signals 18 corresponds to the number of photoelectrons computed by equation (4) above and shown in FIGS. 10 and 11 for various dwell times, star magnitudes, and aperture sizes. Both the sensor output signals 18 and a signal 30 from GNC unit 28 are coupled to a frame registration unit 80, as shown. Also coupled to frame registration unit 80 is signal line 26 from the stellar catalog 24.

Frame registration unit 80 includes a correlator and correlates the sensor output signals 18 with known star information or, more particularly, star intensities associated with a known star scene. A frame refers to simultaneous samples of signals 18 provided by each of the sensor elements in the sensor array 14. Samples of each signal 18 are stored in, or mapped to, a block of memory at addresses corresponding to the location of the associated one of the sensor elements relative to some reference point on the array 14. The data stored is compared to the stored stellar catalog data. That is, once a block of memory in the stellar catalog 24 is found to contain data similar to the stored sensor detected information, the exact position of the system 10 is known from the catalog star location information.

Having correlated the sensed star intensities to known star data stored in stellar catalog 24, the location of such stars can be found in the catalog 24. It is noted that the correlation process can be enhanced (i.e., correlation time reduced) by using the GNC data to determine an initial catalog memory address for starting the correlation process. That is, the GNC unit 28 provides information as to the position and attitude of the system 10 which can be used to estimate the stellar catalog address corresponding to the expected star scene. Note that the fact that a target is present in the field of view does not degrade this correlation between the stored sensor detected information and the stellar catalog information since there are thousands more stars than potential targets in a particular field of view.

It is possible that the sensor output signals 18 will indicate the presence of a star not contained in the stellar catalog 24. In this case, it may be desirable to update the catalog 24 and/or perhaps communicate the information about the "new" star to a ground based receiver. That is, the "new" star data may be written to the stellar catalog 24 via signal line 26. Additionally, the "new"

star information can be communicated to a ground based receiver by a communications interface 86. Moreover, if a communication interface 86 is used, the stellar catalog information can be updated based on information received from a ground based transmitter. While a system having a communication interface 86 capable of transmitting and receiving signals may not be considered completely passive (passive in the sense that energy or signals are not transmitted therefrom), this arrangement may nevertheless be desirable in certain applications. Communication interface 86 may be a satellite transmitter/receiver.

In response to the correlation by frame registration unit 80 of the sensed output signals 18 to a known star scene, data from the stellar catalog 24 is provided to a frame difference detector 90. More particularly, once it is determined which known stars are in the receiver's field of view, the intensity of such stars is provided to a frame difference detector 90 via signal line 26. Frame difference detector 90 determines the difference between the sensor output signals 18 (provided thereto via signal line 72) and the expected, cataloged star magnitudes. That is, signals 18 have a magnitude corresponding to the extent to which a star providing incident light is occluded. Thus, if there are no objects or targets disposed between the receiver 12 and a star 42, then the magnitude of the corresponding sensor output signal 18 is a function only of the starlight received and thus, should equal the expected star magnitude stored in the stellar catalog 24.

Frame difference detector 90 provides a plurality of difference signals 74, each one corresponding to one of the sensor elements and having a value representative of the difference between the corresponding sensor output signal 18 and the expected star magnitude as provided by the stellar catalog 24. In this way, the difference signals 74 indicate the extent to which a target has occluded a particular star.

It is noted that, in the case where the stellar catalog 24 is not used, the frame difference detector 90 averages, and stores the average, of several samples of the signals 72 (corresponding to signals 18). With this information, a difference in the sensor output signals 18 as a function time can be determined. In this way, the presence of a target 40 can be detected without use of the stellar catalog 24 information. Rather, a change in the sensed starlight over time indicates the presence of a target 40.

The difference signals 74 are coupled to a target processor 92 via signals 74, along with signals 26 from the stellar catalog 24. Target processor 92 accomplishes the detection of targets 40 by examining the difference signals 74 and making a determination that a target 40 has been detected if the difference signal 74 exceeds a predetermined value.

More particularly, the difference signals 74 (i.e., representative of the difference between the sensor output signals 18 and the expected star intensities from the stellar catalog 24 and/or the difference in the sensor output signals 18 over time) are compared to a predetermined threshold. If any of the difference signals 74 exceed such threshold, the detection of a target 40 is indicated; whereas, if such difference signals do not exceed the threshold, the signal 22 indicates that no target has been detected. In cases where frame difference detector 90 alternatively, or additionally, provides the difference signals 74 in response to changes in the sensor signals 18 over time, such time difference signals too are compared to a second predetermined threshold in order to provide the target detection signal 22. The first and second predetermined thresholds may be preset or may be provided by the mission controller 32.

Signals 94, generated by the target processor 92, are coupled to a target coordinate generator 96 along with signals 30 from the GNC unit 28 and signals 26 from the stellar catalog 24. With this information, the target coordinate generator 96 provides the target detection signal 22 with target bearing information.

In view of the above discussion, it is noted that the field of view of the receiver 12 can be adjusted to improve the sensitivity of the detecting and tracking system 10. Consider for example the case where the receiver 12 is disposed in a missile 48 (FIG. 1) having a trajectory associated therewith. It may be known that a particular threat, for example another missile 40 (FIG. 1), has been launched and aimed at a known target. Thus, within a predetermined window of interest related to the known launching position and/or known target, the course of the surveillance missile 48 can be adjusted in order to improve the probability of detecting the target 40. That is, given the information in stellar catalog 24, it can be determined where, within the given window of interest, the area of greatest star density is located. With this information, the trajectory of the missile 48 can be adjusted to point to such a star dense area. In this way, the likelihood of target detection by system 10 can be enhanced.

Figure 13:
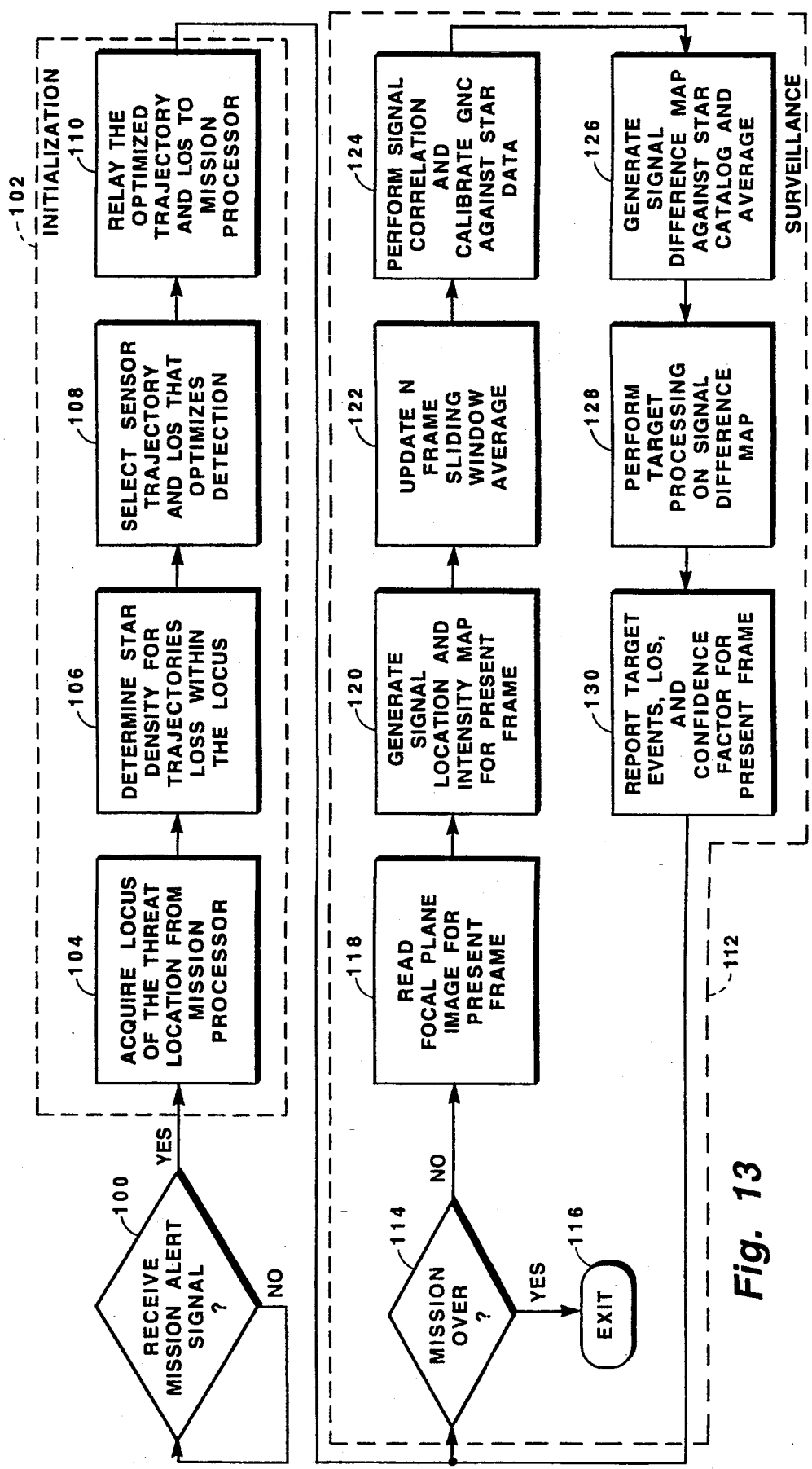
FIG. 13 is a process flow chart for the target detecting and tracking system of FIG. 1.

Referring now to FIG. 13, an embodiment of a detailed process flow diagram is shown. The signal processor 20 is dormant until activated by the mission controller 32 to detect an object or potential threat. Thus, when a mission alert signal is received by the signal processor 20 from the mission controller 32, the process begins at step 100. Thereafter, an initialization sequence 102 is commenced. The mission alert signal initiates acquisition by the signal processor 20 of threat locus information from the mission controller 32 in process step 104. Alternatively, however, process step 104 may be combined with step 100 in that, the mission alert signal may contain the threat locus information. Threat locus information represents the locus or area in which a threat is likely to be located (i.e., the window of interest).

In process step 106, the signal processor 20 computes the star densities associated with various missile 48 trajectories within the locus. With such information, it can be determined which of the trajectories within the locus is associated with the greatest star density by comparing the star densities associated with the various trajectories. In process step 108, the trajectory having the greatest star density is selected as that along which the missile 48, or other receiver 12 carrying mechanism, will travel. With this arrangement, the detection capability of the system 10 is enhanced. More particularly, selection of a high density trajectory increases the probability that a target will cross the LOS between the receiver 12 and a star 42. In process step 110, the optimized trajectory information is transmitted to the mission controller 32 in order to commence the necessary changes in the trajectory of the missile 48. With step 110, the initialization process 102 is completed.

Thereafter, a surveillance sequence 112 is performed beginning with step 114 in which it is determined whether the particular mission has concluded. This step is continuously repeated during surveillance, as shown. Whether the mission is complete is determined by a mission termination signal provided by the mission controller 32. Such a mission termination signal may be generated in response to the lapsing of a predetermined time duration for a particular surveillance mission or in response to receipt of target information from target detecting and tracking system 10, for example. When the mission is completed, process step 116 is carried out and again the signal processor 20 is dormant until receipt of the next mission alert signal. Alternatively, if the mission is not over, process step 118 is next performed in which the focal plane image is read from the sensor array 14 for the present frame. A frame, as mentioned, refers to the simultaneous sampling of each of the sensor output signals 18.

In response to the sensor output signals 18, a signal location and intensity map for the present frame is generated in process step 120. The map comprises a replica of the sensor output signals 18 and, specifically, refers to a memory configuration containing data values representative of received light intensity and stored in memory locations corresponding to the location of the one of the sensor elements which received the particular light intensity. Stated differently, the memory location refers to the angle from which the light was received (i.e., since the angle of the incident light corresponds to a location on the focal plane of sensor array 14). Signal processor 20 computes, in step 122, a "sliding window" average of the signal intensities for each element of array 14.

Thereafter, in process step 124, the frame registration unit 80 functions to correlate the sensed signals 18 with known star information, as described above. It is noted that the GNC unit 28 may be calibrated in response to such correlation information. More particularly, the signals 18 are compared to star magnitudes stored in the stellar catalog 24 in order to determine the viewed star scene and the expected magnitudes of known stars in such scene. In response to the known star location information provided by the stellar catalog 24, the GNC unit 28 may be calibrated. In this way, the GNC 28 may be calibrated by comparison of the location of the missile 48 as determined by the stellar catalog and as determined by the GNC unit 28.

In process step 126, a signal difference map is generated by the frame difference detector 90, as described above in conjunction with FIG. 12. That is, frame difference detector 90 compares the detected signal magnitudes with the cataloged star magnitudes for a given frame. In this way, the difference between such signals is determined and stored at memory locations corresponding to the one of the sensor elements from which the compared sensor output signal 18 is provided.

A second signal difference map is additionally generated in step 126 and is provided by comparing the sensor output signals 18 with the stored output signal average. In this way, a difference between the sensed signals 18 in different frames (i.e., over time) is determined. It is noted that this scheme for determining the presence of a target 40 may be used in instances in which the Stellar catalog 24 is not used, as mentioned above. Alternatively however, it may be desirable to use this detection technique in combination with the comparison between the sensed signals 18 and the stellar catalog information in order to enhance the accuracy of detection.

Having determined the signal difference maps based on the comparison of the sensor output signals 18 against the stellar catalog information and/or against the stored signal averages, respectively, target processor 92 in process step 128, determines whether or not one or more targets has been detected by examining the differences, and assigns a confidence factor to each detected target based on the magnitude of the difference. More particularly, the difference signals stored in the signal difference maps are compared to threshold signals, as described above in conjunction with the target coordinate generator 96 in FIG. 12. When such stored difference signals exceed the threshold, detection of a target (i.e., a detection event) is indicated; whereas, if the stored signals do not exceed the threshold, target detection is not indicated. Thus, the result of the comparison between the stored difference map signals and the threshold signals provide the target detection signal 22. Thereafter, in process step 130, target events are reported to the mission controller 32 (FIG. 1) via target detection signal 22 and/or to a ground based control device via communication interface 86 (FIG. 1).

It may also be desirable to report a confidence factor signal to the mission controller 32. That is, such a confidence factor signal is related to the extent to which the stored difference map signals exceed the threshold signals to which they are compared, as described above. Alternatively, as mentioned above, it may be desirable to use the time averaged signal comparison and the stellar catalog techniques for detecting targets. In this case, the confidence factor signal may be related to whether one or both of such techniques yield an indication of target detection.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

I claim:

1. A system for detecting objects in space utilizing starlight, comprising:
   a receiver for collecting incident starlight;
   a sensor, coupled to said receiver, for sensing said collected starlight focused on said sensor by said receiver and for providing a sensor output signal indicating the intensity of the sensed starlight; and
   a signal processor, responsive to said sensor output signal, for providing a target detection signal indicating whether an object has passed between said receiver and a star,
   wherein said signal processor is further responsive to a stellar background catalog comprising a memory device storing intensity and location information for known stars and comprises a comparator for comparing said sensor output signal with said stellar background catalog to provide said target detection signal.

2. The system recited in claim 1 wherein said signal processor further provides a signal indicating the bearing of an object disposed between said receiver and a star.

3. The system recited in claim 1 wherein said system further comprises an image intensifier, disposed between said receiver and said sensor, for amplifying said collected starlight focused on said sensor.

4. The system recited in claim 3 wherein said image intensifier transposes the focal plane image of incident starlight onto said sensor.

5. A system for detecting objects in space utilizing starlight, comprising:

a receiver for collecting incident starlight wherein said receiver is a telescope comprising:
  (a) a light receiving aperture for receiving incident starlight defining a receiver line of sight; and
  (b) means for focusing said incident starlight onto said sensor at a location corresponding to the angle between said incident starlight and the receiver line of sight;
a sensor, coupled to said receiver, for sensing said collected starlight focused on said sensor by said receiver and for providing a sensor output signal indicating the intensity of the sensed starlight;
a stellar background catalog comprising intensity and location information for known stars; and
a signal processor, responsive to said sensor output signal and said stellar background catalog, for comparing said sensor output signal to said intensity information from said stellar background catalog and for comparing said sensor output signal to a stored average of said sensor output signal to provide a target detection signal indicating whether an object has passed between said receiver and a star.

6. The system recited in claim 1 wherein said sensor comprises a plurality of sensor elements, each one providing a sensor output signal indicating the intensity of the starlight focused thereon by said receiver.

7. A method for detecting objects in space utilizing a receiver for collecting incident starlight and a sensor responsive to starlight focused thereon by said receiver for providing a sensor output signal indicating the intensity of the focused starlight, said method comprising the steps of:
  comparing said sensor output signal with known star intensity information to provide a difference signal;
  providing a target detection signal in response to the difference signal exceeding a predetermined threshold level, said target detection signal indicating that an object has passed between said receiver and a star;
  housing said receiver in a mechanism having a trajectory associated therewith;
  receiving a signal indicating an area to be detected;
  determining, in response to said known star intensity information and known star location information, a trajectory having a maximum star density associated therewith; and
  changing said trajectory of said mechanism in accordance with said trajectory having the maximum star density associated therewith.

8. A method for detecting objects in space utilizing a receiver for collecting incident starlight and a sensor responsive to starlight focused thereon by said receiver for providing a sensor output signal indicating the intensity of the focused starlight, said method comprising the steps of:
  comparing said sensor output signal with known star intensity information to provide a difference signal;
  providing a target detection signal in response to the difference signal exceeding a predetermined threshold level, said target detection signal indicating what an object has passed between said receiver and a star;
  averaging samples of said sensor output signal;
  comparing said sensor output signal with said average to provide a second difference signal; and
  providing said target detection signal in response to the second difference signal exceeding a second predetermined threshold level, said target detection signal indicating that an object has passed between said receiver and a star.

9. A system for detecting objects in space utilizing starlight, said system comprising:
  a passive receiver for collecting incident starlight;
  a sensor coupled to said passive receiver for sensing said collected starlight focused on said sensor and for providing a sensor output signal indicating the intensity of the sensed starlight;
  a guidance and navigation control unit for providing a position signal indicating the position of said receiver relative to earth; and
  a signal processor responsive to said sensor output signal and said position signal for providing a target detection signal indicating whether an object has passed between said passive receiver and a star and the bearing of said object.

10. The system recited in claim 9 wherein said signal processor is further responsive to a stellar background catalog and comprises a comparator for comparing said sensor output signal with said stellar background catalog to provide said target detection signal.

11. The system recited in claim 9 wherein said passive receiver comprises a telescope.

12. The system recited in claim 11 wherein said telescope comprises:
  a light receiving aperture for receiving incident starlight defining a receiver line of sight; and
  means for focusing said incident starlight onto said sensor at a location corresponding to the angle between said incident starlight and the receiver line of sight.

13. A method for detecting objects in space utilizing a receiver for collecting incident starlight and a sensor responsive to starlight focused thereon for providing a sensor output signal indicating the intensity of the focused starlight, said method comprising the steps of:
  comparing said sensor output signal with a stellar background catalog containing intensity and location information for known stars to provide a difference signal; and
  providing a target detection signal in response to the difference signal exceeding a predetermined threshold level, said target detection signal indicating that an object has passed between said receiver and a star.

14. A system for detecting objects in space utilizing starlight, said system comprising:
  a receiver for collecting incident starlight;
  a sensor coupled to said receiver for sensing said collected starlight focused on said sensor for providing a sensor output signal indicating the intensity of the sensed starlight; and
  a signal processor responsive to said sensor output signal and stored stellar information for providing a target detection signal indicating whether an object has passed between said receiver and a star, wherein said signal processor comprises an averaging circuit for averaging samples of said sensor output signal to provide an average and a first comparator for comparing said sensor output signal with said average to provide a first difference signal, said signal processor further comprising a second comparator for comparing said sensor output signal to said stored stellar information to provide a second difference signal, wherein said target detection signal is provided in response to said first and second difference signals exceeding a predetermined threshold level.

15. The system recited in claim 14 wherein said signal processor comprises a comparator for comparing said sensor output signal with said stored stellar information to provide said target detection signal.

16. The system recited in claim 14 wherein said receiver comprises a telescope.

17. The system recited in claim 16 wherein said telescope comprises:
- a light receiving aperture for receiving incident starlight defining a receiver line of sight; and
- means for focusing said incident starlight onto said sensor at a location corresponding to the angle between said incident starlight and the receiver line of sight.

* * * * *

UNITED STATES PATENT AND TRADEMARK OFFICE
CERTIFICATE OF CORRECTION

PATENT NO. : 5,410,143
DATED : April 25, 1995
INVENTOR(S) : Richard J. Jones

It is certified that error appears in the above-indentified patent and that said Letters Patent is hereby corrected as shown below:

Column 6, line 60, in equation 1, "$P_w=W+B^W$" should read

-- $P_w=\dfrac{W}{W+B}$ --.

Column 7, line 33, "PWN$_X$=" should read --$P_{W_{N_X}}=$ --.

Column 11, line 59, "Stellar" should read --stellar--.

Column 13, line 61, "what" should read --that--.

Signed and Sealed this

Twenty-first Day of May, 1996

Attest:

BRUCE LEHMAN

Attesting Officer     Commissioner of Patents and Trademarks